US00RE35576E

United States Patent [19]

Buchheit, Jr. et al.

[11] E Patent Number: Re. 35,576

[45] Reissued Date of Patent: Jul. 29, 1997

[54] METHOD FOR INCREASING THE CORROSION RESISTANCE OF ALUMINUM AND ALUMINUM ALLOYS

[75] Inventors: Rudolph G. Buchheit, Jr., Albuquerque, N. Mex.; Glenn E. Stoner, Charlottesville, Va.

[73] Assignee: Center for Innovative Technology, Herndon, Va.

[21] Appl. No.: 534,929

[22] Filed: Sep. 28, 1995

Related U.S. Patent Documents

Reissue of:

[64] Patent No.: 5,266,356
Issued: Nov. 30, 1993
Appl. No.: 723,445
Filed: Jun. 21, 1991

[51] Int. Cl.[6] ..... B05D 3/02

[52] U.S. Cl. ..... 427/372.2; 427/435; 427/443.2

[58] Field of Search ..... 427/372.2, 435, 427/443.2

[56] References Cited

U.S. PATENT DOCUMENTS

| | | | |
|---|---|---|---|
| 3,973,998 | 8/1976 | Datta et al. | 148/6.14 R |
| 4,004,951 | 1/1977 | Dorsey , Jr. | 148/6.27 |
| 4,054,466 | 10/1977 | King et al. | 148/6.27 |
| 4,063,969 | 12/1977 | Howell, Jr. | 148/6.27 |
| 4,319,924 | 3/1982 | Collins, Jr. et al. | 106/14.12 |

FOREIGN PATENT DOCUMENTS

| | | |
|---|---|---|
| 53-35899 | 3/1974 | Japan . |
| 54-148141 | 11/1979 | Japan . |

OTHER PUBLICATIONS

Abstract from Dialog File 33: Aluminum Industry Abstract Patent No. Japanese J7 7026,211 (16 Feb. 1973) Journal Announcement: 7801.

Isobe, y. et al., "Chemical Conversion Treatment of Aluminum Alloys with the Mixed Solution of $MgSO_4$ and $NaHCO_3$", Boshoku Gitutsu (Corrosion Engineering), 38, pp. 161–166 (1989) (including English Translation) (no month avail.).

Tanaka, S., et al., "Chemical Treatment of Aluminum Alloys with the Mixed Solution of $LiNO_3$ and $NaHCO_3$", Boshoku Gijutsu (Corrosion Engineering) 39, pp. 425–431, Aug. 15, 1990 (and English Translation).

Mushiro, M., et al., "Studies on Aluminum Oxide Film Formed in Alkaline Baths Containing Nitrates, Part 1", Metal Finishing Society of Japan, 23, pp. 370–374 (1972) (no month avail.).

Uchiyama, T., "Recent studies on chemical oxide coatings of aluminum," Japan Institute of Light Metals (Kei–Kimz oku), 32, pp. 202–210 (1982) (no month avail.).

Uchimaya, T., "A Study on Chemical Conversion Coatings Formed on Aluminum in Boiling Sea Water," Metal Finishing Society of Japan (Kinzoku Hyomen Gitjutsu), 37, pp. 178–183 (1986). (No month avail.).

*Primary Examiner*—Bernard Pianalto
*Attorney, Agent, or Firm*—Fitzpatrick, Cella, Harper & Scinto

[57] ABSTRACT

Aluminum and aluminum alloys are protected from corrosion by immersion in an alkaline lithium or alkaline magnesium salt solution. Immersion in the salt solution causes the formation of a protective film on the surface of the aluminum or aluminum alloy which includes hydrotalcite compounds. A post film formation heat treatment significantly improves the corrosion resistance of the protective film.

22 Claims, No Drawings

METHOD FOR INCREASING THE CORROSION RESISTANCE OF ALUMINUM AND ALUMINUM ALLOYS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention is generally related to forming protective coatings on aluminum and aluminum alloys which will increase corrosion resistance by using chemicals that pose a relatively small environmental hazard and have a small toxic effect.

2. Description of the Prior Art

Metal surfaces are often protected from corrosion by the application of a barrier coating. A first category of barrier coatings are anodic oxides, and these types of coatings are usually formed by an electrochemical means known as "anodizing" during immersion in an inorganic acid like $H_2SO_4$ or $H_3PO_4$. Anodic oxides have a wide range of thicknesses and porosities. Porous coatings can be "sealed" in steam, boiling water or various salt solutions. A second category of barrier coatings are ceramic coatings, and these type of coatings are usually special cements applied to a metal to prevent corrosion. A common example of a ceramic coating is porcelain enamel. A third category of coatings are molecular barrier coatings, and these types of coatings are formed by the addition of organic molecules to solution. Effective inhibitors are transported to the metal-solution interface and have a reactive group attached to a hydrocarbon. The reactive group interacts with the metal surface while the hydrocarbon group is exposed to the environment. As the molecules form the molecular barrier coating, corrosion reactions are slowed. A fourth category of barrier coatings are organic coatings, and these types of coatings are generally intended to simply prevent interaction of an aggressive environment with the metal surface. Organic coatings are the most widely used barrier coatings for metals and paint is a typical example of an organic coating. A fifth category of barrier coatings are conversion coatings, and these types of coatings are made by a process which "converts" some of the base metal into the protective oxide coating. Chromate and phosphate conversion coatings are the two most common types of conversion coatings currently used.

Chromate and phosphate conversion coatings can be formed by chemical and electrochemical treatment of a metallic component during immersion in a solution containing hexavalent chromium ($Cr^{+6}$), phosphorus as a phosphate anion, and usually other components. Literally hundreds of subtly different, proprietary chromate conversion coating formulas exist. For aluminum and aluminum alloys, the primary active ingredient in the bath is usually a chromate, dichromate ($CrO_4^{2-}$ or $Cr_2O_7^{2-}$), or phosphate ($PO_4^{3-}$). The pH of the solutions is usually in the range of 1.3 to 2.5, but a few alkaline bath formulas are known. The process results in the formation of a protective, amorphous coating comprised of oxides of the substrate, complex chromium or phosphorus compounds, and other components of the processing solution. Only a small number of coatings and chromating processes have been characterized by surface analysis techniques. But in coating systems that have been studied, the following compounds have been reported: substrate oxides and hydroxides such as $Al_2O_3$ and $Al(OH)_3$, chromium oxides and hydroxides such as $Cr_2O_3$, CrOOH, $Cr(OH)_3$, and $Cr_2O_3 \cdot xH_2O$, and phosphates such as $AlPO_4$. These coatings enhance corrosion resistance of bare and painted surfaces, improve adhesion of paint, or other organic finishes, or provide the surface with a decorative finish.

Chromate conversion coatings are applied by contacting the processed surfaces with a sequence of solutions. The basic processing sequence typically consists of the following six steps: cleaning the metal surface, rinsing, creating the conversion coating on the metal surface, rinsing, post treatment rinsing, and drying. The cleaning, rinsing, and drying steps are fairly standard procedures throughout the industry. The chief variant among the processes used is the composition of the chromate conversion solution. The compositions of these solutions depends on the metal to be treated and the specific requirements of the final product. The chief disadvantage of chromate conversion coating processes is that they involve the use of environmentally hazardous and toxic substances. It is expected that the use of substances like chromates will soon be regulated under stringent guidelines.

Because of the environmental problems with chromates, much work has been done to develop protective coatings which do not employ such compounds. For example, U.S. Pat. No. 4,004,951 to Dorsey discloses applying a hydrophobic coating on an aluminum surface by treatment with a long chain carboxylic acid and an equivalent alkali metal salt of the carboxylic acid, U.S. Pat. No. 4,054,466 to King et al. discloses a process for the treatment aluminum in which vegetable tannin is applied to the surface of the aluminum, and U.S. Pat. No. 4,063,969 to Howell et al. discloses treating aluminum with a combination of tannin and lithium hydroxide. In each of the above patents, the primary protective ingredient is the complex organic compound, the treatment solution is applied at slightly elevated temperatures (90°–125° F.), and the treatment solution is kept at a mid-level pH (4–8 in King and Howell, and 8–10 in Dorsey). Csanady et al., in Corrosion Science, 24, 3, 237–48 (1984) showed that alkali and alkali earth metals stimulated $Al(OH)_3$ growth on aluminum alloys. However, Csanady et al. report that the incorporation of $Li^+$ or $Mg^+$ into a growing oxide film degrades corrosion resistance.

SUMMARY OF THE INVENTION

It is therefore an object of the present invention to provide an improved process for forming a protective coating on aluminum and aluminum alloys which is environmentally sound, utilizes low-cost chemical ingredients, and is procedurally similar to existing coating processes.

It is another object of the present invention to use alkali metal salts, such as $Li_2CO_3$, $Li_2SO_4$, LiCl, LiOH, and LiBr, and alkaline earth metal salts, such as $MgCl_2$, $MgBr_2$, and $MgCO_3$, in a treatment solution having an elevated pH to provide a protective coating on aluminum.

It is yet another object of the present invention to use aqueous alkaline salts to treat aluminum alloys containing lithium to produce a protective coating on the aluminum alloy.

According to the invention, aluminum alloys have been found to exhibit increased corrosion resistance after exposure to aqueous alkaline (pH ranging from 8–13) solutions of lithium salts. Because lithium salts are similar in character to magnesium salts, similar results are likely to be achieved for solutions containing a magnesium cation. Upon immersion in the alkaline bath, a specific chemical composition containing aluminum, lithium (or magnesium) and the salt anion is formed as a protective film on the aluminum surface. Formation of the protective film readily occurs at room temperature. Heating the aluminum substrate after film formation may liberate water and volatile anions bound in the chemical structure of the film. Aluminum alloys which contain lithium or magnesium and magnesium based alloys only need to be treated with an alkaline salt solution to form the protective aluminum-lithium-anion film or aluminum-magnesium-anion film. Lithium and magnesium salts are ubiquitous, low cost compounds which are not hazardous to the environment and, therefore, the inventive process has significant advantages over the use of chromate conversion coatings.

DETAILED DESCRIPTION OF THE PREFERRED EMBODIMENTS OF THE INVENTION

Corrosion resistant films can be formed on aluminum and aluminum alloy components using a multi-step process involving immersion in an alkaline lithium salt bath. Corrosion resistance my be enhanced by a subsequent heat treatment and room temperature aging process. Components to be coated are first degreased using hexane or some other suitable degreasing agent. Then, the components are cleaned in an alkaline bath. The residue from the cleaning process is removed in a deoxidizing acid bath. The components are then immediately immersed in an alkaline lithium salt solution. For example, the solution may be 0.01 to 0.6 M $Li_2CO_3$ (the upper solubility limit). The best results have been achieved with alkaline lithium salt solutions with concentrations ranging from 0.05 to 0.1 M. The pH of the solution must be greater than 8 and is most preferably between 11 and 12. The components remain in the alkaline lithium salt bath for approximately 5 to 60 minutes (or longer for thicker coatings). The salt bath may be maintained at room temperature (e.g., 25°–30° C.) during immersion. The components are then removed and dried. The components may then be heat treated and aged. For example, heating in air at 150° C. and aging for seven days at room temperature yields desirable results. Coatings formed by this process are thin and translucent The appearance of these coatings is similar to that produced by some traditional conversion coating and the corrosion resistance is comparable to some chromate conversion coatings in accelerated testing.

The compounds formed on the aluminum surface during immersion in the salt solution have a structure comprised of layers of hydroxide ions separated by alternating layers of metal (Al and Li (or Mg)) cations and anions of the salt. The compounds belong to a class of clays known as hydrotalcites. The hydrotalcite compounds in the surface film can, without further processing, impart corrosion resistance to the aluminum. However, the protective properties of the film may degrade in acid and neutral solutions. Therefore, a post film formation heat treatment has been found to be beneficial in improving corrosion resistance. Heat treatment is believed to liberate water and volatile anions bound in the hydrotalcite structure to create more corrosion resistant film which is less susceptible to degradation. Titanium salts, hydrofluoric acid, phosphoric acid, and sodium hydroxide may be added to the alkaline lithium salt solution to improve the characteristics of the resulting corrosion resistant film; however, such additions are not required.

Hydrotalcite compounds are detectable on aluminum and aluminum alloys after immersion in solutions with a pH as low as 8. However, increasing amounts of the hydrotalcite compounds result when the solution has a higher pH. Increased corrosion resistance has been observed in the presence of several lithium salt solutions including LiCl, LiOH, LiBr, $Li_2CO_3$, and $Li_2SO_4$. Other lithium salts should also be suitable for hydrotalcite compound formation. Hydrotalcite films are formed in solution at room temperature. Increasing the lithium salt solution temperature causes volatile species like carbonates and sulfates to escape solution as carbon dioxide and sulfur dioxide, thereby inhibiting hydrotalcite formation. Aluminum alloys which contain lithium at a level ranging from 0.5 to 10 weight percent would only need to be exposed to aqueous alkaline salts having anions such as $CO_3^{2-}$, $SO_4^{2-}$, $Cl^-$, $Br^-$, and $OH^-$, or the like, since the lithium in the alloy surface could react with the immersion solution. The immersion time required to form the hydrotalcite compounds in the protective film depends on the alloy type, salt concentration, salt type, and bath pH.

Corrosion performance of the coatings made by the inventive process have been compared to conventional coatings. Accelerated tests were performed using electrochemical imperdanice spectroscopy (EIS) in aerated 0.5 M NaCl solution. In these tests, the polarization resistance, Rp, is determined and provides a measure of the corrosion resistance. In general, larger values of Rp indicate better corrosion resistance. Corrosion performance coatings is tracked as a function of time to determine how long a coating will offer the necessary level of protection. Moreover, the time at which a coating no longer often a threshold level of corrosion protection is a useful way of the ranking the effectiveness of different coating processes. A drawback to evaluating coating corrosion performance in actual service environments is that testing times can be exceedingly long. An ideal test environment is one that is severe enough to keep testing times down, but maintains enough sensitivity to distinguish among different levels of coating performance and induces damage by the same mechanisms that are expected to operate under service conditions. EIS testing in 0.5 M NaCl solution satisfies these criteria (e.g., film breakdown can be detected in reasonable periods of time, the performance of various coatings can be distinguished, the performance of coatings on various alloys can be distinguished, and the damage mechanisms are followed since chloride ion instigates film failure in service environments).

In the EIS tests, five panels were prepared from commercial sheet stock. The sheet stock used was alloy 1100, which has a composition of 99.5% Al with the remainder being iron, silicon and copper and is commercially available from Kaiser Aluminum and Chemical Corporation. The test panels were cut from the sheet stock and mechanically polished with successively finer SiC paper ending with a 600 grit final polish. The panels were then decreased by immersing them in 1,1,1 tricloroethane at 70° C. and deoxidized in an ammonium bifluoride (75 g/l)/concentrated nitric acid bath for ten minutes. The panels were then rinsed in a 10 mega-Ohm distilled water cascade for five minutes. The panels were then subjected to immediate immersion procedures for film formation. The first panel had a film formed by immersion in 0.6M $Li_2CO_3$ at pH 11.2 for one hour at room temperature. After removing the panel from the immersion bath, it was cascade rinsed in distilled water and allowed to dry in ambient air. The panel was aged seven days in a desiccator at room temperature prior to EIS testing. The second panel had a film formed by the same process as the first panel, but, it was additionally subjected to a heat treatment step of 150° C. for four hours. The third panel had a film formed by the Parker-Amchem Alodine 1200 process.

The film is a mixture of hydrated aluminum oxide $Cr^{6+}$ and various chromium oxides, the relative proportions of which can vary widely. The fourth panel was given a chromate conversion coating treatment of fifteen minutes in 1.0M $Na_2CrO_4$ at pH 8.5. The fifth panel acted as a control and did not have a protective film formed thereon.

Table 1 shows the polarization resistance measurements for the five panels after three hours exposure to 0.5M NaCl.

TABLE 1

| Alloy 1100 | |
|---|---|
| Type of Coating | RP (ohms-cm$^2$) |
| (1) Lithium Carbonate | $1.5*10^4$ |
| (2) Lithium Carbonate + Heat | $1.5*10^5$ |
| (3) Alodine 1200 | $2.5*10^4$ |
| (4) Chromate | $1.5*10^5$ |
| (5) No Coating | $1.0*10^3$ |

As can be seen from Table 1, the polarization resistance (Rp) measurements were as good or better than that measured for the standard alodine coating and the chromate coating. Table 1 also shows that the post film formation heat treatment resulted in improving the corrosion resistance by an order of magnitude. Similar improved corrosion resistance results were obtained with other aluminum alloys.

It has also been determined that under constant immersion conditions in NaCl at the free corrosion potential, the coating polarization resistance increases. Table 2 presents the measured polarization resistance of lithium carbonate coated and heat treated aluminum alloy 1100 vebus time in aerated 0.5M NaCl solution at pH 5.5.

TABLE 2

| Immersion Time (hours) | Rp (ohms-cm$^2$) |
|---|---|
| 0 | $2.0*10^5$ |
| 20 | $1.5*10^5$ |
| 43 | $2.0*10^5$ |
| 67 | $6.0*10^5$ |
| 91 | $3.0*10^3$ |
| 115 | $7.0*10^3$ |
| 240 | $5.0*10^5$ |

The increase with time in the immersion bath indicates that barrier properties may be maintained for extended exposure periods under less severe service conditions. The anticipated service conditions are atmospheric exposure 0–100% relative humidity and/or under organic and polymeric paints and coatings.

Another electrochemical method for evaluating corrosion performance is known as anodic potentiodynamic polarization testing. Typical parameters obtained from such testing that are commonly used to characterize corrosion behavior are the corrosion potential ($E_{corr}$), the breakaway potential ($E_{br}$), and the passive current density ($i_{pass}$). Lower corrosion potentials usually correspond with lower corrosion resistance. The breakaway potential is the potential at which the surface film no longer offers significant protection from corrosion; therefore, higher breakaway potentials correspond with more corrosion resistance. The passive current density is a direct measure of the corrosion rate in the potential range where the surface firm is stable. Lower passive current densities correspond with better corrosion resistance.

Tables 3 and 4 show the anodic polarization data summary for 99.999% aluminum in deaerated 0.6M salt solutions at a pH ranging from 6 to 7 and at a pH ranging from 10 to 10.5, respectively.

TABLE 3

| pH = 6–7 | | |
|---|---|---|
| | LiCl | NaCl |
| $E_{coff}(V_{sce})$ | −1.020 | −0.940 |
| $E_{br}(V_{sce})$ | −0.640 | −0.660 |
| $i_{pass}(A/cm^2)$ | $7.0*10^{-7}$ | $4.0*10^{-7}$ |

TABLE 4

| pH = 10–10.5 | | |
|---|---|---|
| | LiCl | NaCl |
| $E_{COFF}(V_{sce})$ | −1.500 | −1.750 |
| $E_{br}(V_{sce})$ | −0.600 | −0.650 |
| $i_{pass}(A/cm^2)$ | $1.5*10^{-6}$ | $7.0*10^{-5}$ |

In Table 3, the polarization curve parameters are similar for LiCl and NaCl which would indicate no special passivating effects due to the presence of lithium in a neutral solution. However, the results in Table 4 show that the more alkaline lithium containing solution increases the breakaway potential by 0.050 Volts and the passive current density is reduced by an order of magnitude compared to the similar sodium containing solution.

Table 5 summarizes anodic polarization data obtained for 99.999% aluminum in various other lithium salt solutions.

TABLE 5

| | 0.1M $Li_2SO_4$ pH 11.0 | 0.1M LiBr pH 11.0 | 0.1M LiOH pH 10.5 |
|---|---|---|---|
| $E_{COFF}(V_{sce})$ | −1.850 | −1.750 | −1.800 |
| $E_{br}(V_{sce})$ | −0.420 | −0.040 | −0.420 |
| $i_{pass(A/cm^2)}$ | $2.5*10^{-5}$ | $9.0*10^{-6}$ | $1.0*10^{-6}$ |

In each case, the measured $E_{br}$ and/or $i_{pass}$ parameters indicate a beneficial passivating effect. Hence, a wide variety of lithium salts can be used in immersion solutions to create a corrosion resistant film on aluminum and aluminum alloys.

To determine whether aluminum-lithium alloys could be passivated by exposure to an alkaline solution (e.g., non-lithium containing since lithium is present in the alloy), 99.999% Al and an Al-3 weight percent Li alloy (Al-3Li) were immersed in 0.6M NaCl at pH 5.5 and pH 10 prior to anodic potentiodynamic polarization testing. Tables 6 and 7 present the anodic polarization data summaries for 99.999% Al in deaerated 0.6M NaCl solution and for a solution heat treated and quenched Al-3Li in deaerated 0.6M NaCl solution, respectively.

TABLE 6

| 99.999% Al in Deaerated 0.6M NaCl Solution | | |
|---|---|---|
| | pH 5.5 | pH 10 |
| $E_{COFF}(V_{sce})$ | −0.985 | −1.340 |
| $E_{br}(V_{sce})$ | −0.725 | −0.725 |
| $i_{pass}$ (A/cm$^2$) | $1.0*10^{-7}$ | $3.0*10^{-7}$ |

TABLE 7

| Solution Heat Treated and Quenched Al-3Li in Deaerated 0.6M NaCl Solution | | |
|---|---|---|
| | pH 5.5 | pH 10 |
| $E_{COFF}(V_{sce})$ | −0.965 | −1.080 |
| $E_{br}(V_{sce})$ | −0.640 | −0.575 |
| $i_{pass}$ (A/cm$^2$) | $2.1*10^{-6}$ | $2.0*10^{-7}$ |

With reference to Table 6, the corrosion potential for 99.999% pure aluminum decreases by nearly 0.400V, and neither $E_{br}$ nor $i_{pass}$ are significantly changed. This indicates that no benefit was obtained by treating the pure aluminum with the alkaline solution. However, with reference to Table 7, the Ai-3Li treated with the alkaline NaCl solution had an $E_{br}$ which increased by 0.065 V and an $i_{pass}$ which was reduced by a factor of 10. These results indicate that corrosion resistance of the aluminum-lithium alloy was significantly increased by pretreatment with the alkaline salt.

In general, the first element in a group in the Periodic Table exhibits properties which deviate from the trends of its group. Commonly the physical and chemical behavior of the first element in the group is more like the elements in the next group (see Bodie et at., Concepts and Models of Inorganic Chemistry, 2nd, John Wiley & sons, Inc. New York, 1983). Physical chemists have described this phenomena as "diagonal relationships", referring to the fact that the element is similar in behavior to an element diagonally positioned to it on the Periodic Table. Lithium, being the first element in Group IA behaves more like Group IIA magnesium than other Group IA elements, like sodium and potassium. Diagonal relationships are evident when comparing physical properties like solubility. For example, fluorides, carbonates and phosphates of Mg and Li are only moderately soluble, while the same Na and K compounds are highly soluble.

There are several physical and chemical characteristics shared by lithium and magnesium which would suggest that magnesium salts could be used to protect aluminum and aluminum alloys in the same manner shown above for lithium salts. For instance, lithium and magnesium compounds have unusually high lattice energies resulting in relatively good chemical stability. The hydrolysis behavior of lithium and magnesium are also similar (see Baes et al., Hydrolysis of Cations, Robert E. Krieger Publishing Co., Malabar, FL, 1986). Lithium is the only Group IA ion to hydrolyze appreciably, but does so only in extremely alkaline solutions. Magnesium also hydrolyzes, but does not do so appreciably before the precipitation of brucite ($Mg(OH)_2$). In the bath solutions discussed above in conjunction with the present invention, lithium exists mainly as $Li^+$ and is believed to be imbibed into $Al(OH)_3$ to form a hydrotalcite-like structure. Similarly, magnesium in the bath solution would exist primarily as $Mg^{2+}$ and would also be easily imbibed. The radii of the two ions is nearly identical (e.g., 0.086 nm for $Li^+$ and 0.090 nm for $Mg^{2+}$) so these cations could occupy the same sites in the cation layer of the hydrotalcite structure without significantly altering the structure. In fact, the naturally occurring variant of hydrotalcite, $Mg[Al_2(OH)_6]_2 \cdot CO_3 nH_2O$) contains magnesium (see Miyata, Clay Minerals, 23, 369–375, 1975).

While the invention has been described in terms of its preferred embodiments, those skilled in the art will recognize that the invention can be practiced with modification within the spirit and scope of the appended claims.

Having thus described our invention, what we claim as new and desire to secure by Letters Patent is as follows:

1. A method for providing an aluminum alloy containing lithium with a surface coating that protects against corrosion, comprising the steps of immersing a substrate comprised of an aluminum alloy that contains 0.5 to 10 weight percent lithium in an alkaline salt solution having a pH of at least 8 and a concentration ranging from 0.01M to 1.0M wherein an anion of said salt in said alkaline salt solution is capable of forming a salt with said lithium in said aluminum alloy, and drying a film formed on said substrate after said step of immersing.

2. A method as recited in claim 1 wherein said anion of said salt in said alkaline salt solution is selected from the group consisting of $CO_3^{2-}$, $SO_4^{2-}$, $Cl^-$, $Br^-$, and $OH^-$.

3. A method as recited in claim 2 wherein said step of immersing is performed when said alkaline salt solution has a temperature ranging from 25° C. to 30° C.

4. A method as recited in claim 1 further comprising the step of heating said film formed on said substrate.

5. A method as recited in claim 4 wherein said step of heating is performed at approximately 150° C. for approximately four hours.

6. A method of protecting aluminum and aluminum alloys against corrosion comprising the step of immersing an aluminum or aluminum alloy in an aqueous solution consisting [solely] *essentially of* a lithium salt *to form a corrosion resistant coating.*

*7. A method of protecting aluminum and aluminum alloys against corrosion comprising the step of immersing an aluminum or aluminum alloy in an aqueous solution which is free of a quantity of tannin sufficient to form a corrosion resistant coating, comprising a lithium salt to form a corrosion resistant coating.*

*8. A method of protecting aluminum and aluminum alloys against corrosion comprising the step of immersing an aluminum or aluminum alloy in an alkaline aqueous solution consisting essentially of a lithium salt to form a corrosion resistant coating.*

*9. A method as recited in claims 6, 7 or 8 wherein the pH is greater than 9.*

*10. A method as recited claims 6, 7 or 8 where the pH is 10 or greater.*

*11. A method as recited in claims 6, 7 or 8 wherein the lithium salt is LiCl, LiOH, LiBr, $Li_2CO_3$ or $Li_2SO_4$.*

*12. A method as recited in claims 6, 7 or 8 wherein the concentration of the lithium salt ranges from 0.01 to 0.6 molar.*

*13. A method as recited in claims 6, 7 or 8 wherein said concentration of the lithium salt ranges from 0.05 molar to 0.1 molar.*

*14. A method as recited in claims 6, 7 or 8 wherein said immersing step is performed when the lithium salt solution has a temperature ranging from 25° C. to 30° C.*

*15. A method as recited in claims 6, 7 or 8 further comprising the step of heating the coating formed on the aluminum or aluminum alloy to improve the corrosion resistance of the coating.*

*16. A method as recited in claim 15 wherein said heating step is performed at approximately 150° C. for approximately 4 hours.*

*17. A method of protecting aluminum and aluminum alloys against corrosion by forming a hydrotalcite coating on a surface of an aluminum or aluminum alloy substrate by immersing said substrate in a solution consisting essentially of a lithium salt solution having a pH which allows hydrotalcite formation, for a length of time sufficient to allow a degree of hydrotalcite formation which provides corrosion resistance for the substrate.*

*18. A method as recited in claim 17 wherein said pH is greater than 10.*

*19. A method as recited in claim 17 wherein said length of time is on the order of minutes.*

*20. A method as recited in claim 17 wherein said alkaline metal salt is a lithium salt selected from the group consisting of LiCl, LiOH, LiBr, $Li_2CO_3$ or $Li_2SO_4$.*

*21. A method as recited in claim 17 wherein said step of immersing is performed at approximately room temperature.*

*22. A method as recited in claim 17 further comprising the step of heating the hydrotalcite coating subsequent to formation to improve the corrosion resistance of the coating.*

* * * * *

UNITED STATES PATENT AND TRADEMARK OFFICE

CERTIFICATE OF CORRECTION

PATENT NO. : Re. 35,576

DATED : July 29, 1997

INVENTOR(S): RUDOLPH G. BUCHHEIT, JR. ET AL.

It is certified that error appears in the above-identified patent and that said Letters Patent is hereby corrected as shown below:

ON TITLE PAGE, AT [56] REFERENCES CITED, FOREIGN PATENT DOCUMENTS

"53-35899 3/1974 Japan." should read --53-35899 3/1978 Japan.--.

ON TITLE PAGE, AT [56] REFERENCES CITED, OTHER PUBLICATIONS

Under "Isobe, y. et al.:" "Isobe, y. et al." should read --Isobe, Y. et al.-- and "Gitutsu" should read --Gijutsu--.

COLUMN 1

Line 53, "phosphorus" should read --phosphorous--.

COLUMN 2

Line 30, "treatment" should read --treatment of--.

COLUMN 3

Line 21, "my" should read --may--;
Line 44, "coating" should read --coatings--.

COLUMN 4

Line 21, "imperdanice" should read --impedance--;
Line 28, "often" should read --offers--;
Line 52, "decreased" should read --degreased--;
Line 53, "1,1,1 tricloroethane" should read --1,1,1-trichloroethane--.
Line 63, "ElS" should read --EIS--.

UNITED STATES PATENT AND TRADEMARK OFFICE

CERTIFICATE OF CORRECTION

PATENT NO. : Re. 35,576

DATED : July 29, 1997

INVENTOR(S): RUDOLPH G. BUCHHEIT, JR. ET AL.

It is certified that error appears in the above-identified patent and that said Letters Patent is hereby corrected as shown below:

COLUMN 5

Table 1, "RP" should read --Rp--;
Line 31, "vebus" should read --versus--;
Table 2, "$3.0*10^3$" should read --$3.0*10^5$--
"$7.0*10^3$" should read -$7.0*10^5$--;
Line 63, "firm" should read --film--.

COLUMN 6

Table 3, "$E_{coff}$" should read --$E_{corr}$--;
Table 4, "$E_{COFF}$" should read --$E_{corr}$--;
Table 5, "$E_{COFF}$" should read --$E_{corr}$--;
Table 6, "$E_{COFF}$" should read --$E_{corr}$--;

COLUMN 7

Table 7, "$E_{COFF}$" should read --$E_{corr}$--;
Line 16, "Ai-3Li" should read --Al-3Li--
Line 24, "at.," should read --al.,--;
Line 25, "sons," should read --Sons,--;
Line 60, "$\cdot CO_3nH_2O$)" should read ---$\cdot CO_3nH_2O$--

UNITED STATES PATENT AND TRADEMARK OFFICE

CERTIFICATE OF CORRECTION

PATENT NO. : Re. 35,576

DATED : July 29, 1997

INVENTOR(S): RUDOLPH G. BUCHHEIT, JR. ET AL.

It is certified that error appears in the above-identified patent and that said Letters Patent is hereby corrected as shown below:

COLUMN 8

Line 11, "claim I" should read --claim 1--;

Line 40, "where" should read --wherein--.

Signed and Sealed this

Twelfth Day of May, 1998

Bruce Lehman

*Attest:*

BRUCE LEHMAN

*Attesting Officer*

*Commissioner of Patents and Trademarks*